(12) United States Patent
Wu

(10) Patent No.: US 8,444,077 B2
(45) Date of Patent: May 21, 2013

(54) INTEGRAL BLENDER

(75) Inventor: Andy Wu, Quanzhou (CN)

(73) Assignee: Quanzhou Yida Home Appliance Industry Co., Ltd., Quanzhou, Fujian (CN)

( * ) Notice: Subject to any disclaimer, the term of this patent is extended or adjusted under 35 U.S.C. 154(b) by 387 days.

(21) Appl. No.: 12/923,352

(22) Filed: Sep. 16, 2010

(65) Prior Publication Data

US 2012/0067991 A1 Mar. 22, 2012

(51) Int. Cl.
*A47J 43/046* (2006.01)

(52) U.S. Cl.
USPC .................... 241/282.2; 241/285.1

(58) Field of Classification Search
USPC ............... 241/199.12, 282.1, 282.2, 285.1, 241/285.2, 285.3; 366/314, 341; 426/519
See application file for complete search history.

(56) References Cited

U.S. PATENT DOCUMENTS

| 3,089,652 | A  | * | 5/1963 | Haber | 241/69 |
| 7,028,930 | B2 | * | 4/2006 | Carnevale | 241/37.5 |
| 7,185,837 | B2 | * | 3/2007 | Oliver et al. | 241/282.1 |

* cited by examiner

*Primary Examiner* — Mark Rosenbaum
(74) *Attorney, Agent, or Firm* — Bacon & Thomas, PLLC

(57) ABSTRACT

An integral blender includes a hollow shell having a horizontal conical plate integrally formed in the interior to divide the interior of the hollow shell into a container portion and a base portion. The conical plate has a through hole. The base portion is employed to accommodate a transmitting mechanism provided with a shaft extending out of the through hole to be fixedly connected with a cutter in the container. The shaft is closely wrapped with a waterproof annular seal having the bottom combined together with the conical plate. Therefore, with the container portion and the base portion integrally formed together, manufacturing cost can be lowered and convenience in practice can be advanced.

7 Claims, 4 Drawing Sheets

INTEGRAL BLENDER

BACKGROUND OF THE INVENTION

1. Field of the Invention

This invention relates to a blender, particularly to one with a container and a base integrally formed together so as to save manufacturing and assembling costs.

2. Description of the Prior Art

Commonly, a blender is used to cut and grind vegetables or fruits into juice. As shown in FIG. 1, a conventional blender 1 consists of a base 10 and a container 11. The base 10 has the interior installed with a motor provided with an upper portion 100 for being engaged with a cutter shaft base located in the bottom of the container 11. A cutter installed in the container 11 rotates to juice vegetables or fruits when the motor is turned on. However, as the base 10 and the container 11 are independently manufactured, two different molds are needed, thus increasing the cost of manufacture. Moreover, in order to keep the motor and the cutter shaft base well engaged or separated, they have to be respectively installed with a clutch, thereby acquiring too many components and increased cost of assembly.

SUMMARY OF THE INVENTION

The object of this invention is to offer an integral blender that has a container and a base integrally and inseparably formed together so as to save manufacturing and assembling costs.

The integral blender includes a hollow shell having a horizontal conical plate integrally formed in the interior of the hollow shell to divide the interior of the hollow shell into a container portion and a base portion with the two portions being integral and inseparable from each other. The conical plate has a through hole. The base portion is employed to accommodate a transmitting mechanism provided with a shaft extending out of the through hole to be directly and fixedly connected with a cutter in the container portion and without requiring a detachable clutch mechanism. The shaft is closely wrapped with a waterproof annular seal having the bottom combined together with the conical plate. Therefore, with the container portion and the base portion integrally formed together, the manufacturing cost can be lowered and convenience in practice can be advanced.

BRIEF DESCRIPTION OF DRAWINGS

This invention is better understood by referring to the accompanying drawings, wherein.

DETAILED DESCRIPTION OF THE PREFERRED EMBODIMENT

Figure 1:
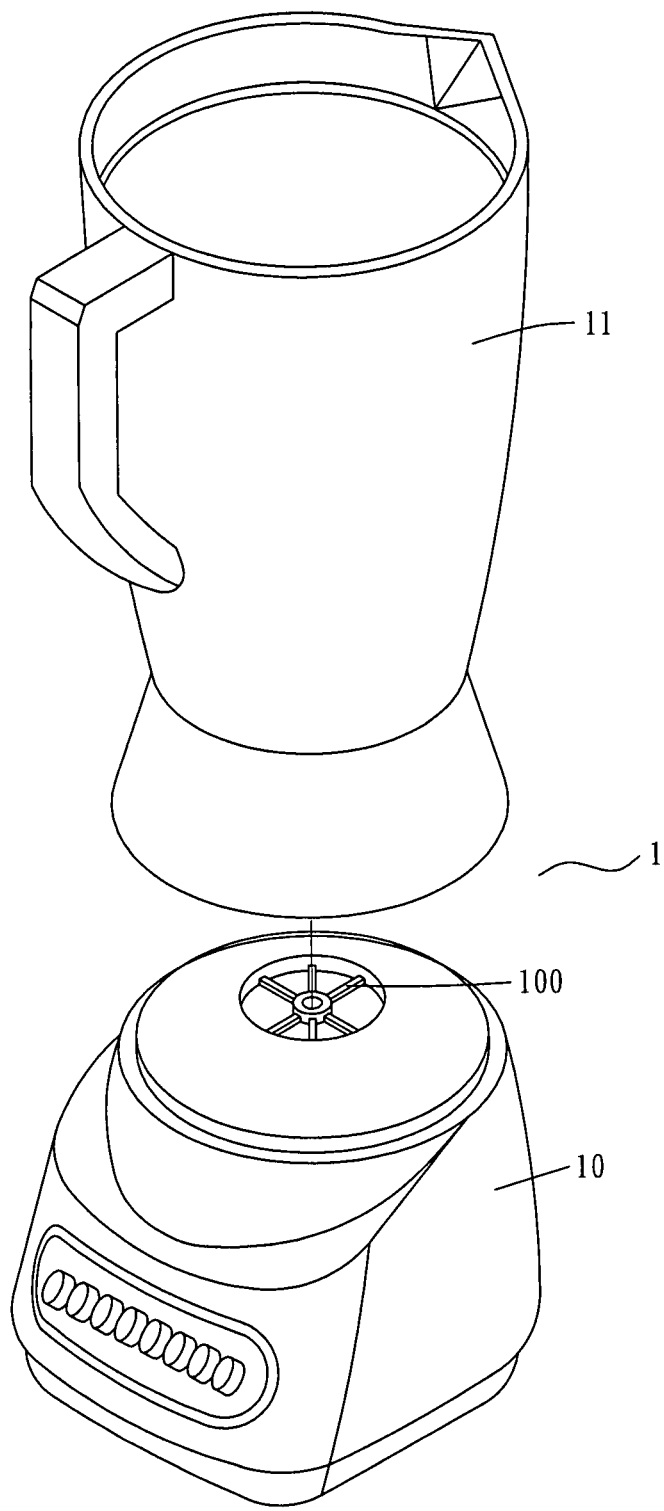
FIG. 1 is an exploded perspective view of a conventional blender.
Figure 2:
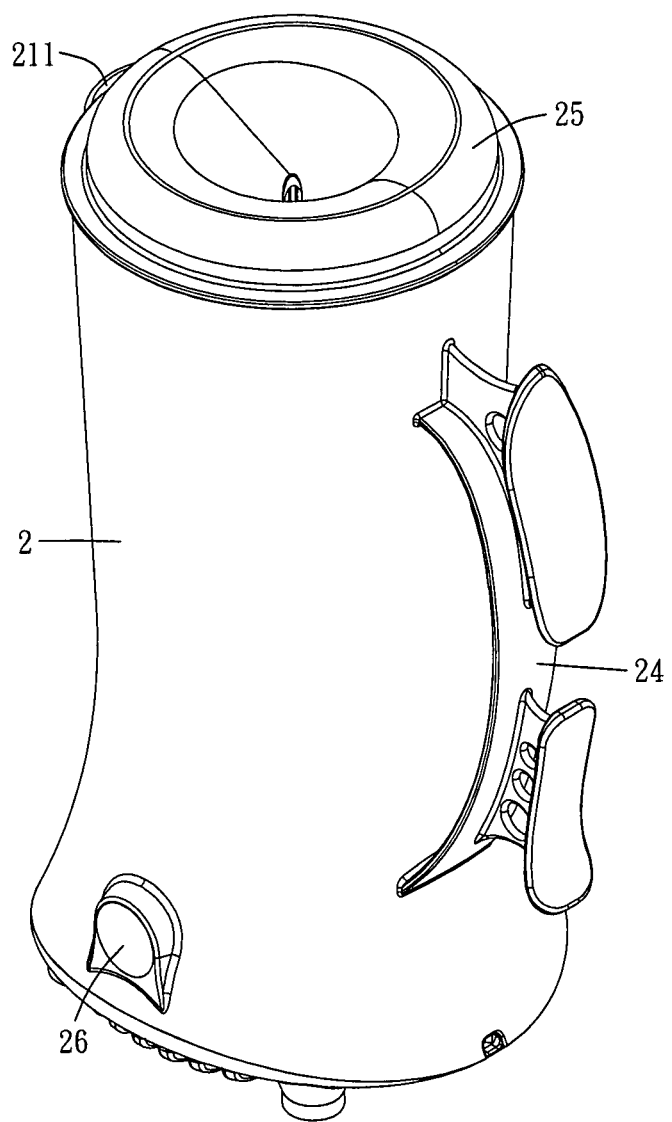
FIG. 2 is a perspective view of a preferred embodiment of an integral blender in the present invention.
Figure 3:
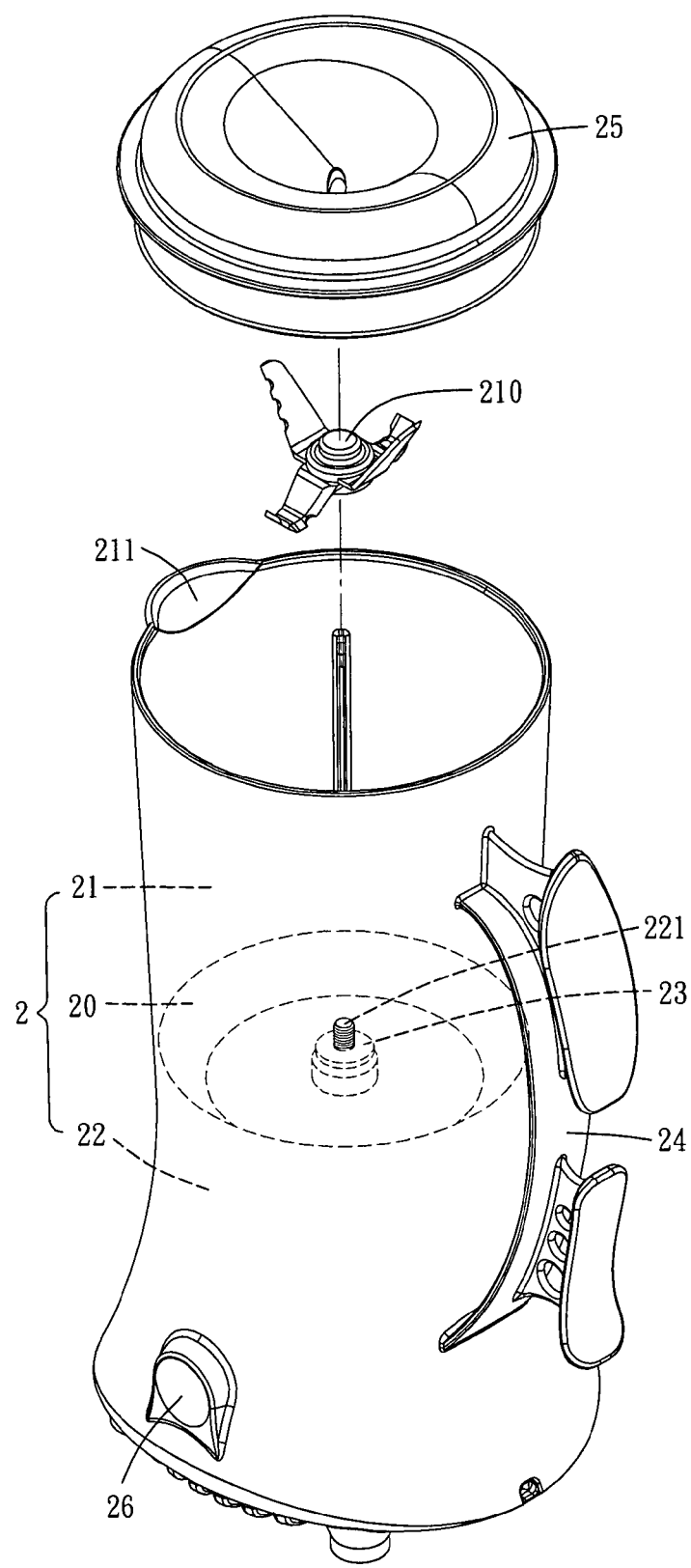
FIG. 3 is a partial exploded perspective view of the preferred embodiment of an integral blender in the present invention.
Figure 4:
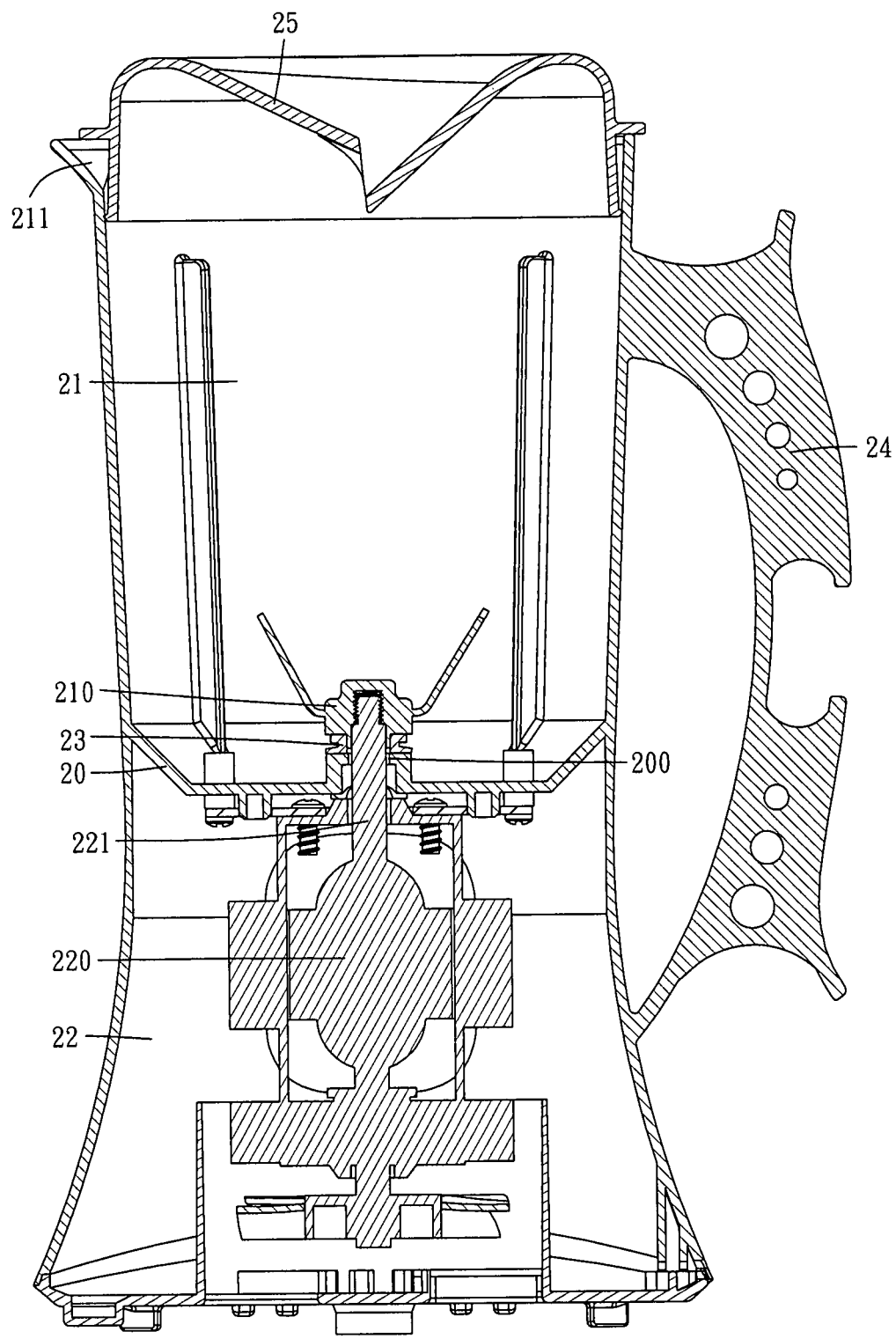
FIG. 4 is a cross-sectional view of the preferred embodiment of an integral blender in the present invention.

As shown in FIGS. 2~4, a preferred embodiment of an integral blender in the present invention mainly includes a hollow shell 2 having a horizontal conical plate 20 integrally formed in the interior, which divides the interior of the hollow shell 2 into two independent spaces, with the upper one denoted as a container 21 and the lower one denoted as a base 22. The container 21 and base 22, being integrally formed, are inseparable from each other. The conical plate 20 has a through hole 200 cut in the center, as shown in FIG. 4. Installed in the base 22 is a transmitting mechanism 220 provided with a shaft 221 extending out of the through hole 200 to be directly and fixedly connected with a cutter 210 in the container portion 21. This connection eliminates the need for a detachable clutch mechanism. The cutter 210 is made of stainless steel blades integrally cast with plastics. The shaft 221 is closely wrapped with a waterproof annular seal 23 having the bottom combined together with the conical plate 20 to seal the through hole 200, so that liquid in the container 21 is unable to run along the shaft 200 into the base 22. The hollow shell 2 is provided with a handle 24 located at one side for being grabbed by a user. The container 21 is provided with a spout 211 extended outward from one side of the top circumference to lead the liquid in the container 21 to smoothly run out. A lid 25 is used to cover on the top of the container 21 to prevent dust or other foreign matters from dropping into the container. Set on the outside of the hollow shell 2 to correspond to the base portion 22 is a switch 26 employed to control the transmitting mechanism 220.

In using, as shown in FIGS. 3 and 4, the lid 25 is first moved away and vegetables and fruits are put into the container 21. Next, the lid 25 is restored on the container 21. Then turn on the switch 26 to drive the driving mechanism 220 and the shaft 221. So the cutter 210 can be driven to start rotating so as to crack the vegetables or fruits into juice. Turn off the switch 26 after cracking. Grab the handle 24 to lift up the blender, with the spout 211 aiming at a container to pour the juice into it.

The invention has at least the following advantages as can be seen from the foresaid description.

1. With a single mold to integrally manufacture the container portion 21 and the base portion 22, costs of mold and assembling can be reduced.

2. With the cutter 210 being directly connected with the shaft 221 of the transmitting mechanism 220 all the time, the blender of the invention does not need the detachable clutch mechanisms required by the conventional blender.

3. As long as grabbing the handle 24, the juice can be directly poured out, very convenient for using.

While the preferred embodiment of the invention has been described above, it will be recognized and understood that various modifications may be made therein and the appended claims are intended to cover all such modifications that may fall within the spirit and scope of the invention.

What is claimed is:

1. An integral blender comprising a hollow shell having a horizontal conical plate integrally formed in an interior of said hollow shell to divide said interior of said hollow shell into a container portion and a base portion, the container portion and base portion being integrally formed and inseparable from each other said conical plate having a through hole used to keep said container portion communicated with said base portion, said base portion including a transmitting mechanism that is provided with a shaft extending out of said through hole to be directly and fixedly connected with a cutter in said container portion and in the absence of a detachable clutch mechanism, said shaft closely wrapped with a waterproof annular seal having a bottom combined together with said conical plate.

2. The integral blender as claimed in claim 1, wherein said through hole is cut in a center of said conical plate.

3. The integral blender as claimed in claim 1 or 2, wherein said cutter is made of stainless steel blades integrally cast with plastics.

4. The integral blender as claimed in claim 1, wherein said hollow shell is provided with a handle located at one side.

5. The integral blender as claimed in claim 1 or 4, wherein a lid is used to cover on a top of said container portion.

6. The integral blender as claimed in claim 5, wherein said container portion is provided with a spout extended outward from one side of a top circumference.

7. The integral blender as claimed in claim 6, wherein a switch is set on an outside of said hollow shell to correspond to said base portion so as to control said transmitting mechanism.

* * * * *